Patented Mar. 10, 1942

2,276,243

UNITED STATES PATENT OFFICE 2,276,243

PRODUCTION OF ALKYD RESINS

Herbert John West, Riverside, Conn., assignor to American Cyanamid Company, New York, N. Y., a corporation of Maine No Drawing. Application February 16, 1939, Serial No. 256,734

2 Claims. (Cl. 260—22)

This invention relates to the manufacture of synthetic resins of the alkyd type; that is to say, resins comprising or consisting of condensed polyhydric alcohol-polybasic acid esters, either as such or modified with oils, oil acids or lower fatty acids.

In the manufacture of alkyd resins of these classes it is customary to charge the resin kettle with phthalic anhydride or other organic polycarboxylic acid, glycerine or other polyhydric alcohol and the modifying constituents such as drying, non-drying, or semi-drying oils or mixtures thereof and carry out the esterification and condensation by continued heating. This method is known as the "simultaneous" process and is carried out by heating the mixture to temperatures of 400–550° F. for suitable periods of time.

Another process of making oil modified or oil-acid modified alkyd resins is known as the monoglyceride process, and consists in reacting the oil or oil-acid with so much glycerine as to form the monoglyceride of the fatty acid or fatty acid mixture. The organic polybasic acid is then charged and the mixture is heated to esterification and condensation as in the simultaneous process.

In both methods of manufacture it is important to obtain resins of low acid number, as this determines to a great extent the water resistance of the resin. It is a principal object of the present invention to improve the existing processes of alkyd resin preparation, as outlined above, whereby resins of low acid number are more easily obtained. It is a further object to avoid the danger of gelation during the final stages of the heating process while the resin is being held for a low acid number. Still further objects will become apparent from the following description when taken with the claims appended hereto.

I have found that premature polymerization and gelation of alkyd resins is suppressed during manufacture when relatively small quantities of aminotriazines are present in the reaction mixture. This discovery is of great commercial importance, for it permits the operator to hold the resin at high temperatures for longer periods of time, thereby producing resins of extremely low acid numbers without danger of spoiling the batch. Moreover, I have found that substantial quantities of aminotriazines may be used for this purpose without danger of discoloring the resin, for the aminotriazines as a class are extremely stable and are not subject to decomposition in the resin kettle.

Among the aminotriazines themselves, melamine is probably of greatest utility by reason of its low cost and solubility in glycerine and other polyhydric alcohols, but any triazine containing one or more amino or imino or amido groups may be used. For example such compounds as formoguanamine, monoamino 1.3.5 triazine, ammeline, ammelide, melam or melem may be used, as well as hydrocarbon substituted triazines such as phenyl diamino 1.3.5 triazine, monomethyl diamino 1.3.5 triazine or triazines containing substituted amino groups such as 2.4.6 triethyl or triphenyl triamino 1.3.5 triazine.

The invention will be illustrated in greater detail by the following specific example. It is understood, however, that this example is given primarily for purposes of illustration and that in its broader aspects the invention is not limited thereto.

*Example*

A mixture of 1 part of melamine and 10 parts of glycerine is heated at 220° C. until the melamine is completely dissolved. 20 parts of phthalic anhydride are added and 25 parts of soya fatty acids, and the whole is reacted at 220–250° C. until the acid number is less than 10. The reaction is preferably carried out in the usual resin kettle equipped with an agitator and with means for maintaining an atmosphere of nitrogen or carbon dioxide in the resin in order to avoid discoloration. A pale colored resin is obtained which as a 50% solution in xylol or other suitable solvent has a color of 4–7 (Hellige scale). This resin has excellent water resistance and is well suited for use in the manufacture of baking enamels.

What I claim is:

1. A method of preparing phthalic glyceride resins of low acid number which comprises reacting phthalic anhydride with glycerine at elevated temperatures in the presence of melamine in amounts of about 1 part of melamine for each 20 parts of phthalic anhydride.

2. A method of producing a fatty oil-acid modified phthalic glyceride resin which comprises reacting together at high temperatures phthalic anhydride, glycerine and a fatty oil-acid in the presence of melamine in amounts of about 1 part of melamine for each 20 parts of phthalic anhydride.

HERBERT J. WEST.